Patented Apr. 17, 1934

1,955,375

UNITED STATES PATENT OFFICE 1,955,375

PROTEIN PRODUCT AND PROCESS OF MAKING

Charles N. Cone and Earl D. Brown, Seattle, Wash., assignors, by mesne assignments, to The Glidden Company, Cleveland, Ohio, a corporation of Ohio No Drawing. Application March 5, 1930,
Serial No. 433,519

19 Claims. (Cl. 134—20)

In the preparation of sizing or coating bases, it has been generally customary heretofore to employ casein. Casein, while offering certain desirable qualities, is, however, characterized by important drawbacks, which have heretofore been regarded as matters to be put up with as inevitable concomitants of this art. Casein for instance is subject to foaming in the make-up and handling, and particularly where employed in coating, occasions much trouble, since all traces of foam must be eliminated before suitable coating can be had. Again, in coating, the mineral filler materials, as kaolin, blancfixe, satin white, etc., tend to settle out to such an extent as to require much attention in agitation. Furthermore, casein is susceptible to the action of lime to such an extent as to gel and thicken, and for this reason, particularly if the temperature be raised, the use of lime or a lime-containing material such as satin white has been beset with especial difficulties. Again, casein sizing or coating is always attended with a characteristic odor which is very objectionable. In accordance with the present invention, however, we are enabled to prepare a material for sizing or coating, which obviates such difficulties, and can be readily employed without requirement of special precautions.

To the accomplishment of the foregoing and related ends said invention, then consists of the features hereinafter fully described, and particularly pointed out in the claims, the following description setting forth in detail certain illustrative embodiments of the invention, these being indicative, however, of but a few of the various ways in which the principle of the invention may be employed.

In proceeding in accordance with our invention, oleaginous seed material, as for instance soya bean, cottonseed, peanut, tung nut, castor bean, linseed, etc., may be employed as starting material. Where dealing with such material as peanut, tung nut, linseed, castor bean, and some dark varieties of soya bean, the dark colored shell or hull should be removed by suitable decortication or the like, unless a dark coloration of the ultimate product be unobjectionable. With such material as light colored soya bean however, a light colored product may be had without any special precaution as to the hulls. Preferably, a large portion of the oil should be removed, and the pressed cake resulting from commercial methods of extracting the oil is directly available for our purpose to excellent advantage. Such material is desirably reduced to finer state of subdivision for succeeding operations and preferably is ground to a flour or meal. Fine grinding conduces to the readiness with which the succeeding steps may be effected.

With the suitably crushed or ground seed material a treatment is carried out with water and a reagent, preferably of alkaline character. For instance, a ground seed material may be treated with water and a strong alkali, such as caustic soda, in proportion for example of about 100 parts of ground seed press cake with about 2000 parts of water and about 10 parts of caustic soda. If the temperature be raised, the time of digestion may be shortened; and similarly to some extent the strength of reagent has bearing upon the time factor, temperature, strength of alkali and time being to an extent interchangeable. With a higher temperature or greater amount of alkali a shorter time of treatment may be had, or with a higher temperature and smaller amount of alkali a longer time is employed; or if a greater amount of alkali and a longer time be employed a low temperature may be used. The digestion in aqueous solution occasions a denaturing action on the protein, besides making possible the elimination of other seed constituents. In this treatment, the protein becomes dispersible, that is, now capable of being taken up in an aqueous menstruum and its ultimate viscosity may be controlled. By viscosity is meant the viscosity of the sizing or coating mixtures as finally made up from the protein base. The denaturing action occurring is not of a simple nature, and if it be carried too far, the adhesive properties of the protein may be impaired. With a caustic soda solution and treating proportions as above noted, a temperature of 60° F. for about 24 hours may be employed. If the temperature be raised for instance to 120° F., however, the time can be shortened to about two hours.

Among other strong alkalis which may be employed instead of sodium hydroxide, there may be mentioned such hydroxides as potassium, lithium, calcium, barium, strontium hydroxides, etc. By choice of alkali or alkaline earth hydroxides, the product may be modified as desired, due to specific action. Where operating with a caustic soda solution, all of the protein in the seed material may be dissolved out. Insoluble residue may be eliminated by centrifuging or settling. If to the clarified liquor an alkaline earth, such for instance as lime be added, a flocculent precipitate containing about 10–20% of the protein is thrown out, this component being insoluble in calcium hydroxide solution. If the seed material be digested with lime water in the first instance instead of with caustic soda solution, similarly about 10% of the protein will be rejected by the lime solution. Such lime-insoluble protein cannot very readily be taken up by an application of caustic soda solution. The lime-soluble protein as obtained in accordance with our process is a much superior form of protein for paper sizing and coating usage. It has superior adhesive qualities and gives a somewhat lighter coating, and also with the same amount of denaturing action a lower viscosity is obtained than in the case of the caustic soda soluble protein. With the use of lime as denaturing agent, as pointed out, part of the protein is lost, being insoluble. This lime-insoluble component may be suitably treated with caustic soda solution and be denatured to be used as a lower grade material for coating or adhesives if desired. Preferably, however, we digest in the first instance with a weakly alkaline salt solution, such as sodium sulfite, sodium phosphate, etc., and in accordance with this feature of the invention, the portion of protein which would not be denatured with the lime treatment in the first instance is likewise left, but in such condition that it can be easily recovered to be denatured with caustic soda and thereby be available as a lower grade adhesive for paper or other usages. The method is based on the fact that we have discovered that the portion of the protein made insoluble by the lime is in general not extracted by water or by solutions of the alkaline salts. We accordingly prefer to initially digest with an alkaline salt solution. For example: about 100 parts of the ground seed meal, for instance soya bean cake, is mixed with about 2000 parts of water and about three parts of sodium sulfite. This is agitated for two or three hours and is then separated by suitable means, as by centrifuging. The liquor is then heated to the desired temperature and about 10 parts of lime are added. A flocculent precipitate is formed by the lime and this is separated out by suitable means, as by centrifuging. The liquor is then held at a suitable temperature for a sufficient time so that the lime denatures the protein and makes it dispersible among other properties. About 16 hours at around 60° F. is satisfactory, or as pointed out the time factor can be shortened by raising the temperature for instance 2 hours at around 120° F. The protein is now precipitated from the liquor by adjusting the hydrogen ion concentration. The desired properties are especially favored by precipitation at about pH 4.0, while the handling properties are especially favored by precipitation at about pH 4.4. For this, an acid is convenient, and sulphuric acid is preferable, because of ease of handling and low cost. The handling properties are further greatly improved if the precipitation be carried out at an elevated temperature, such as around 120° F. The precipitated curd may be drained and may be directly made up into the sizing if desired. Or the curd may be pressed to about 65% moisture content (actual basis) and then be disintegrated by a suitable grinder and then be dried at a low temperature, for instance around 100° F. or at 90° F. to about 6% moisture. The material may be then ground to desired mesh, for example, 40 mesh, and may be stored until ready to make up with the water for the sizing.

As another example: The ground seed flour, for instance soya bean cake, is mixed with water of about 60° F. in proportion of about 20 parts of water to one part of flour, and hydrated lime (about 10% flour basis) is added, and the material is agitated, and is allowed to stand for about 12 hours, and the insoluble matter is eliminated by suitable means, such as by centrifuging. The clear liquor is heated to about 120° F. Sulphuric acid (about one part to eight parts of water) is added to a pH of about 4.0 to cause precipitation. About one-fourth the amount of cold water originally used is now added, and the curd is allowed to settle for about an hour. The liquid is separated and the curd washed with cold water to original dilution and is allowed to settle for about an hour. The wash water is separated and the curd filtered on canvas, and pressed to about 60% moisture, and is disintegrated in a suitable grinder, and is dried at about 90° F. to approximately 6% moisture, and is further ground to about 40 mesh. It may then be stored until ready for mixing up with water for the sizing operation.

Where dealing with a caustic soda sludge, the protein is easier to handle if carbon bisulphide be added, this causing a finely flocculent precipitate to agglomerate together in better form. The protein material prepared is readily capable of being mixed with satin white or other lime-containing material without undesirably gelling, even though heat be applied in the making up. It is thus particularly advantageous in paper coating, and with lime introduced as satin white or as such, a coating of exceptional water resistance is had. In making up with water for sizing also, our denatured protein occasions relatively little foaming as compared with sizing materials heretofore customary, and on mixing in the mineral constituents for coating, a superior suspension is secured, mineral constituents such as satin white, blancfixe, kaolin, etc., holding up without undesirable settling out. The sizing may be made up by employment of weakly alkaline salts, and our protein material being so readily dispersible, mixtures are thus simply made from the dry powdered form, and with relatively small amounts of water may be brought to condition for the coating machine. Paper coating with our material takes an excellent finish on the calender rolls and the surface may be further treated if desired by varnish and will not be darkened by penetration. The superior water resistant properties resultant from the action of lime furthermore make it possible to directly obtain a highly satisfactory product in this respect without necessity of resort to additional treatments with formaldehyde and like agents. The product, furthermore, is free from objectionable odor, and is thus highly desirable in particular usages where such a condition has not heretofore been attainable.

Other modes of applying the principle of the invention may be employed, change being made as regards the details described, provided the features stated in the following claims, or the equivalent of such, be employed.

We therefore particularly point out and distinctly claim as our invention:

1. A process of manufacturing treated protein suitable for use in paper coating, comprising subjecting oleaginous seed material to the action of a solution of sodium sulfite, separating undissolved matter, adding lime to the solution, treating the said undissolved matter with a solution of a strong alkali, precipitating protein from the lime solution, precipitating protein from the said alkali solution, and washing the respective proteins.

2. A process of manufacturing treated protein suitable for use in paper coating, comprising subjecting oleaginous seed material to the action of a solution of a weakly alkaline salt, separating undissolved matter, adding lime to the solution, treating the said undissolved matter with a solution of a strong alkali, precipitating protein from the lime solution, precipitating protein from the said alkali solution, and washing the respective proteins.

3. A process of manufacturing treated protein suitable for use in paper coating, comprising subjecting oleaginous seed material to the action of sodium sulfite solution, separating undissolved matter, adding lime to the solution, allowing to stand, eliminating insoluble matter, heating the solution, precipitating the protein therefrom, adding water and washing the precipitate, and disintegrating.

4. A process of manufacturing treated protein suitable for use in paper coating, comprising subjecting oleaginous seed material to the action of a solution of a weakly alkaline salt, separating undissolved matter, addition lime to the solution, allowing to stand, eliminating insoluble matter, heating the solution, precipitating the protein therefrom, adding water and washing the precipitate, and disintegrating.

5. A process of manufacturing treated protein suitable for use in paper coating, comprising subjecting oleaginous seed material to the action of a solution of sodium sulfite, eliminating undissolved matter, adding lime to the solution, allowing to stand, and finally precipitating the lime soluble protein from the solution.

6. A process of manufacturing treated protein suitable for use in paper coating, comprising subjecting oleaginous seed material to the action of a solution of a weakly alkaline salt, separating undissolved matter, adding lime to the said solution, separating any solid matter developed, heating the said solution, and precipitating the lime-soluble protein.

7. A process of manufacturing treated protein suitable for use in paper coating, comprising subjecting ground soya bean cake to the action of a sodium sulfite solution, eliminating undissolved matter, adding lime to the solution, and precipitating the lime-soluble protein.

8. A process of manufacturing treated protein suitable for use in paper coating, comprising subjecting ground soya bean cake to the action of a solution of a weakly alkaline salt, eliminating undissolved matter, adding lime to the solution, and precipitating the lime-soluble protein.

9. A process of manufacturing treated protein suitable for use in paper coating, comprising subjecting ground soya bean cake to the action of a sodium sulfite solution, and subsequently digesting in the presence of hydrated lime.

10. A process of manufacturing treated protein suitable for use in paper coating which comprises subjecting ground soya bean seed cake to the action of a weakly alkaline salt, and subsequently digesting in the presence of hydrated lime.

11. A process of manufacturing treated protein suitable for use in paper coating, which comprises subjecting oleaginous seed material to the action of a solution of a weakly alkaline salt, and subsequently digesting in the presence of hydrated lime.

12. A process of manufacturing treated protein suitable for use in paper coating, which comprises dissolving protein from oleaginous seed material, denaturing the protein, and recovering from the solution a protein which even after having been dried is soluble in a weakly alkaline solution.

13. A process of manufacturing treated protein suitable for use in paper coating, which comprises dissolving protein from oleaginous seed material with a weakly alkaline salt solution, denaturing the protein, and recovering from the solution a protein which even after having been dried is soluble in a weakly alkaline solution.

14. A process of manufacturing treated protein suitable for use in paper coating, which comprises extracting oleaginous seed material with a weakly alkaline solution, eliminating protein insoluble in lime water, and isolating a protein which even after having been dried is soluble in lime water.

15. A process of manufacturing treated protein suitable for use in paper coating, which comprises extracting oleaginous seed material with a sodium sulphite solution, eliminating protein insoluble in lime water, and isolating a protein which even after having been dried is soluble in lime water.

16. A process of manufacturing treated protein suitable for use in paper coating, which comprises extracting oleaginous seed material with a weakly alkaline solution, eliminating protein insoluble in lime water, digesting this insoluble protein with caustic soda solution, recovering from the weakly alkaline solution a special grade of protein, and recovering from the caustic soda solution a lower grade protein.

17. A process of manufacturing treated protein suitable for use in paper coating, which comprises dissolving protein from oleaginous seed material, subjecting the dissolved protein to a prolonged digestion in the presence of lime, and recovering from the solution a protein which even after having been dried is soluble in lime water.

18. A process of manufacturing treated protein suitable for use in paper covering, which comprises dissolving protein from oleaginous seed material, precipitating the protein, and promoting agglomeration by carbon bisulphide.

19. As an article of manufacture, a treated protein suitable for use in paper covering, comprising a dried oil seed protein substantially free from other seed constituents and denatured to a condition dispersible in a weakly alkaline salt solution.

CHARLES N. CONE.
EARL D. BROWN.